(12) United States Patent
Rodriguez

(10) Patent No.: US 10,033,292 B2
(45) Date of Patent: Jul. 24, 2018

(54) POWER CONDITIONING UNIT WITH VOLTAGE CONVERTERS

(71) Applicant: SolarCity Corporation, San Mateo, CA (US)

(72) Inventor: Cuauhtemoc Rodriguez, Cambridge (GB)

(73) Assignee: SolarCity Corporation, San Mateo (*) Notice: Subject to any disclaimer, the term of this patent is extended or adjusted under 35 U.S.C. 154(b) by 0 days.

(21) Appl. No.: 15/807,540

(22) Filed: Nov. 8, 2017

(65) Prior Publication Data
US 2018/0069482 A1    Mar. 8, 2018

Related U.S. Application Data

(63) Continuation of application No. 15/264,573, filed on Sep. 13, 2016, now Pat. No. 9,831,794, which is a
(Continued)

(30) Foreign Application Priority Data

Nov. 8, 2004    (GB) .................................. 0424556.9

(51) Int. Cl.
*H02M 5/458*    (2006.01)
*H02M 7/48*     (2007.01)
(Continued)

(52) U.S. Cl.
CPC ............. *H02M 5/458* (2013.01); *H02J 3/383* (2013.01); *H02J 3/387* (2013.01); *H02M 1/08* (2013.01);
(Continued)

(58) Field of Classification Search
CPC .......... H02M 5/458; H02M 1/08; H02M 1/12; H02M 7/48; H02M 7/53871;
(Continued)

(56) References Cited

U.S. PATENT DOCUMENTS 2,852,721 A    9/1958    Harders et al.
4,479,175 A    10/1984   Gille et al.
(Continued)

FOREIGN PATENT DOCUMENTS

DE    19732218 C1    3/1999
DE    19937410 A1    2/2001
(Continued)

OTHER PUBLICATIONS

International Search Report dated Aug. 6, 2012 for International Patent Application No. PCT/BG2012/050097, 13 pages.
(Continued)

*Primary Examiner* — Emily P Pham
(74) *Attorney, Agent, or Firm* — Kilpatrick Townsend & Stockton LLP

(57) ABSTRACT

A power conditioning unit for delivering power from a power source to a mains utility supply, the power conditioning unit comprising a plurality of input terminals for connecting to the power source, a plurality of output terminals for connecting to the mains utility supply, a voltage increasing converter connected to the input terminals, a voltage reducing converter connected to the voltage increasing converter and a dc-to-ac converter connected to the voltage reducing converter and to the output terminals.

15 Claims, 4 Drawing Sheets

Related U.S. Application Data continuation of application No. 14/542,386, filed on Nov. 14, 2014, now Pat. No. 9,473,038, which is a continuation of application No. 13/748,375, filed on Jan. 23, 2013, now Pat. No. 8,971,082, which is a continuation of application No. 11/718,879, filed as application No. PCT/GB2005/050197 on Nov. 4, 2005, now Pat. No. 8,369,113.

(51) Int. Cl.
| | | |
|---|---|---|
| *H02J 3/38* | (2006.01) | |
| *H02M 1/12* | (2006.01) | |
| *H02M 7/5387* | (2007.01) | |
| *H02M 1/08* | (2006.01) | |
| *H02M 1/00* | (2006.01) | |
| *H02J 3/40* | (2006.01) | |

(52) U.S. Cl.
CPC ............... *H02M 1/12* (2013.01); *H02M 7/48* (2013.01); *H02M 7/53871* (2013.01); *H02M 7/53873* (2013.01); *H02J 3/40* (2013.01); *H02M 2001/007* (2013.01); *H02M 2001/0009* (2013.01); *Y02E 10/563* (2013.01)

(58) Field of Classification Search
CPC ..... H02M 7/53873; H02M 2001/0009; H02M 2001/007; H02J 3/383; H02J 3/387; H02J 3/40
See application file for complete search history.

(56) References Cited

U.S. PATENT DOCUMENTS

| | | | |
|---|---|---|---|
| 4,626,983 A | 12/1986 | Harada et al. | |
| 4,772,994 A | 9/1988 | Harada et al. | |
| 5,268,832 A | 12/1993 | Kandatsu | |
| 5,329,222 A | 7/1994 | Gyugyi et al. | |
| 5,379,209 A | 1/1995 | Goff | |
| 5,381,327 A | 1/1995 | Yan et al. | |
| 5,404,059 A | 4/1995 | Loeffler et al. | |
| 5,442,538 A | 8/1995 | Ikeda et al. | |
| 5,504,449 A | 4/1996 | Prentice et al. | |
| 5,576,941 A | 11/1996 | Nguyen et al. | |
| 5,585,749 A | 12/1996 | Pace et al. | |
| 5,814,970 A | 9/1998 | Schmidt | |
| 5,898,585 A | 4/1999 | Sirichote et al. | |
| 5,930,131 A | 7/1999 | Feng | |
| 6,021,052 A | 2/2000 | Unger et al. | |
| 6,058,035 A | 5/2000 | Madenokouji et al. | |
| 6,081,104 A | 6/2000 | Kern | |
| 6,111,767 A | 8/2000 | Handleman | |
| 6,211,657 B1 | 4/2001 | Goluszek et al. | |
| 6,330,170 B1 | 12/2001 | Wang et al. | |
| 6,339,538 B1 | 1/2002 | Handleman et al. | |
| 6,369,461 B1 | 4/2002 | Jungreis et al. | |
| 6,445,599 B1 | 9/2002 | Nguyen et al. | |
| 6,657,419 B2 | 12/2003 | Renyolds et al. | |
| 6,678,174 B2 | 1/2004 | Suzui et al. | |
| 6,690,592 B2 | 2/2004 | Link et al. | |
| 6,791,850 B2 | 9/2004 | Pai et al. | |
| 6,856,102 B1 | 2/2005 | Lin et al. | |
| 6,888,728 B2 | 5/2005 | Takagi et al. | |
| 6,950,323 B2 | 9/2005 | Achleitner et al. | |
| 6,980,783 B2 | 12/2005 | Liu et al. | |
| 7,031,176 B2 | 4/2006 | Kotsopoulos et al. | |
| 7,064,967 B2 | 6/2006 | Ichinose et al. | |
| 7,078,883 B2 | 7/2006 | Chapman et al. | |
| 7,099,169 B2 | 8/2006 | West et al. | |
| 7,158,395 B2 | 1/2007 | Deng et al. | |
| 7,193,872 B2 | 3/2007 | Siri et al. | |
| 7,262,979 B2 | 8/2007 | Wai et al. | |
| 7,319,313 B2 | 1/2008 | Dickerson et al. | |
| 7,324,361 B2 | 1/2008 | Siri et al. | |
| 7,339,287 B2 | 3/2008 | Jepsen et al. | |
| 7,414,870 B2 | 8/2008 | Röttger et al. | |
| 7,417,336 B2 | 8/2008 | Johnson | |
| 7,450,401 B2 | 11/2008 | Iida | |
| 7,463,500 B2 | 12/2008 | West | |
| 7,466,566 B2 | 12/2008 | Fukumoto et al. | |
| 7,479,774 B2 | 1/2009 | Wai et al. | |
| 7,502,242 B2 | 3/2009 | Iida | |
| 7,525,256 B2 | 4/2009 | Ribarich et al. | |
| 7,885,085 B2 | 2/2011 | Orr et al. | |
| 8,067,855 B2 | 11/2011 | Mumtaz et al. | |
| 8,139,382 B2 | 3/2012 | Zhang et al. | |
| 8,369,113 B2 | 2/2013 | Rodriguez | |
| 8,811,047 B2 | 8/2014 | Rodriguez | |
| 8,971,082 B2 | 3/2015 | Rodriquez | |
| 2002/0034083 A1 | 3/2002 | Ayyanar et al. | |
| 2002/0085397 A1 | 7/2002 | Suzui et al. | |
| 2002/0149950 A1 | 10/2002 | Takebayashi et al. | |
| 2003/0038615 A1 | 2/2003 | Elbanhawy et al. | |
| 2003/0080741 A1 | 5/2003 | LeRow et al. | |
| 2003/0193821 A1 | 10/2003 | Krieger et al. | |
| 2004/0076028 A1 | 4/2004 | Achleitner et al. | |
| 2004/0165408 A1 | 8/2004 | West et al. | |
| 2004/0207366 A1 | 10/2004 | Sung et al. | |
| 2004/0217742 A1 | 11/2004 | Ribarich et al. | |
| 2004/0233685 A1 | 11/2004 | Matsuo et al. | |
| 2005/0030772 A1 | 2/2005 | Phadke et al. | |
| 2005/0242795 A1 | 11/2005 | Al-Kuran et al. | |
| 2006/0171182 A1* | 8/2006 | Siri ................... H02M 3/33592 363/131 |
| 2006/0232220 A1 | 10/2006 | Melis | |
| 2007/0035975 A1 | 2/2007 | Dickerson et al. | |
| 2007/0133241 A1 | 6/2007 | Mumtaz et al. | |
| 2007/0290656 A1 | 12/2007 | Lee Tai Keung | |
| 2008/0055941 A1 | 3/2008 | Victor et al. | |
| 2008/0164766 A1 | 7/2008 | Adest et al. | |
| 2008/0205096 A1 | 8/2008 | Lai et al. | |
| 2008/0266919 A1 | 10/2008 | Mallwitz et al. | |
| 2008/0285317 A1 | 11/2008 | Rotzoll et al. | |
| 2008/0291707 A1 | 11/2008 | Fang et al. | |
| 2008/0304296 A1 | 12/2008 | NadimpalliRaju et al. | |
| 2008/0304298 A1 | 12/2008 | Toba et al. | |
| 2009/0097283 A1 | 4/2009 | Krein et al. | |
| 2009/0140577 A1 | 6/2009 | Fishman et al. | |
| 2010/0157632 A1 | 6/2010 | Batten et al. | |
| 2010/0195361 A1 | 8/2010 | Stem et al. | |
| 2010/0207455 A1 | 8/2010 | Erickson, Jr. et al. | |
| 2011/0205766 A1 | 8/2011 | Rodriguez | |
| 2011/0273015 A1 | 11/2011 | Adest et al. | |
| 2012/0033463 A1 | 2/2012 | Rodriguez | |
| 2013/0235637 A1 | 9/2013 | Rodriguez | |
| 2015/0236604 A1 | 8/2015 | Rodriguez | |

FOREIGN PATENT DOCUMENTS

| | | |
|---|---|---|
| DE | 10064039 A1 | 12/2001 |
| EP | 628901 A2 | 12/1994 |
| EP | 780750 A2 | 6/1997 |
| EP | 947905 A2 | 10/1999 |
| EP | 1235339 A2 | 8/2002 |
| EP | 1239576 A2 | 9/2002 |
| EP | 2666219 A2 | 11/2013 |
| GB | 1571681 A | 7/1980 |
| GB | 2415841 A | 1/2006 |
| GB | 2487368 A | 7/2012 |
| GB | 2487495 A | 7/2012 |
| JP | 01311874 | 12/1989 |
| JP | 05003678 A | 1/1993 |
| JP | 07028538 A | 1/1995 |
| JP | 08227324 A | 9/1996 |
| JP | 08317664 A | 11/1996 |
| JP | 10174452 A | 6/1998 |
| JP | 2000020150 A | 1/2000 |
| JP | 2000316282 A | 11/2000 |
| JP | 2000324852 A | 11/2000 |
| JP | 2003289674 A | 10/2003 |
| WO | 2004100348 A1 | 11/2004 |
| WO | 2006048688 A1 | 5/2006 |

(56) References Cited

FOREIGN PATENT DOCUMENTS

| WO | 2007124518 A1 | 11/2007 |
|---|---|---|
| WO | 2009134756 A1 | 11/2009 |
| WO | 2012098390 A2 | 7/2012 |

OTHER PUBLICATIONS

International Preliminary Report on Patentability, dated Jul. 23, 2013, for International Patent Application No. PCT/BG2012/050097, 9 pages.
Author Unknown, "DC Combiner Box Enables Better Awareness for Active Management," SolarMagic DC Monitoring Combiner Box Specifications, Apr. 2011, 2 pages, National Semiconductor Corporation.
Author Unknown, "SolarMagic power optimizer; Integrated Smart Panel Chipset Maximizes PV System Efficiency at the Lowest Cost per kWh," SM3320-1A1 Power Optimizer Specifications, Sep. 2010, 2 pages, National Semiconductor Corporation.
Calais, Martina, et al., "Inverters for Single-Phase Grid Connected Photovoltaic Systems-Overview and Prospects," Proceedings of the 17th European Photovoltaic Solar Energy Conference, Oct. 22-26, 2001, pp. 437-440, Munich, Germany.
Kikuchi, Naoto, et al., "Single Phase Amplitude Modulation Inverter for utility Interactive Photovoltaic System," IECON '99 Proceedings, Nov. 29-Dec. 3, 1999, pp. 385-389, IEEE.
Kjaer, Soeren Baekhoej, et al., "Design Optimization of a Single Phase Inverter for Photovoltaic Applications," IEEE 34th Annual Power Electronics Specialist Conference, Jun. 15-19, 2003, pp. 1183-1190, vol. 3, IEEE.
Kotsopoulos, Andrew, et al., "Predictive DC Voltage Control of Single-Phase PV Inverters with Small DC Link Capacitance," IEEE International Symposium, Month Unknown, 2003, pp. 793-797.
Krein, Philip T., et al., "Cost-Effective Hundred Year Life for Single-Phase Inverters and Rectifiers in Solar and LED Lighting Applications Based on Minimum Capacitance Requirements and a Ripple Power Port," Applied Power Electronics Conference and Exposition, Feb. 15-19, 2009, pp. 620-625.
Marra, Enes Goncalves et al., "Self-Excited Induction Generator Controlled by a VS-PWM Converter Providing High Power-Factor Current to a Single-Phase Grid," Proceedings of the 24th Annual Conference of IEEE, Aug. 31-Sep. 4, 1998, pp. 703-708, vol. 2, IEEE.
Martins, Denizar Cruz, et al., "Interconnection of a Photovoltaic Panels Array to a Single-Phase Utility Line from a Static Conversion System," Power Electronics Specialists Conference, Jun. 2000, IEEE 31st Annual, pp. 1207-1211, vol. 3.
Nonaka, Sakutaro, et al., "Interconnection System with Single Phase IGBT PWM CSI Between Photovoltaic Arrays and the Utility Line," Industry Applications Society Annual Meeting, Oct. 7-12, 1990, pp. 1302-1307, IEEE.
Rodriguez, Cuauhtemoc, et al., "Dynamic Stability of Grid-Connected Photovoltaic Systems," Power Engineering Society General Meeting, Jun. 6-10, 2004, 7 pages, IEEE.
Rodriguez, Cuauhtemoc, et al., "Long-Lifetime Power Inverter for Photovoltaic AC Modules," IEEE Transactions of Industrial Electronics, Jul. 2008, pp. 2593-2601, vol. 55, No. 7, IEEE.
Shimizu, Toshihisa, et al., "A Flyback-type Single Phase Utility Interactive Inverter with Low-frequency Ripple Current Reduction on the DC Input for an AC Photovoltaic Module System," IEEE 33rd Annual Power Electronics Specialist Conference, Month Unknown, 2002, pp. 1483-1488, vol. 3, IEEE.
Sun, Xiaofeng, et al., "A Research on Photovoltaic Energy Controlling System with Maximum Power Point Tracking," Proceedings of the Power Conversion Conference—Osaka, Apr. 2-5, 2002, pp. 822-826, vol. 2, IEEE.
Yatsuki, Satoshi, et al., "A Novel AC Photovoltaic Module System based on the Impedance-Admittance Conversion Theory," IEEE 32nd Annual Power Electronics Specialists Conference, Month Unknown, 2001, pp. 2191-2196, vol. 4, IEEE.

* cited by examiner

POWER CONDITIONING UNIT WITH VOLTAGE CONVERTERS

CROSS-REFERENCES TO RELATED APPLICATIONS

This application is a continuation of application Ser. No. 15/264,573, filed Sep. 13, 2016, which is a continuation of application Ser. No. 14/542,386, filed Nov. 14, 2014, now U.S. Pat. No. 9,473,038, issued Oct. 18, 2016, which is a continuation of U.S. application Ser. No. 13/748,375, filed Jan. 23, 2013, now U.S. Pat. No. 8,971,082, issued Mar. 3, 2015, which is a continuation of U.S. application Ser. No. 11/718,879, filed May 21, 2009, now U.S. Pat. No. 8,369,113, issued Feb. 5, 2013, which is a National Stage Entry of PCT/GB2005/050197, filed Nov. 4, 2005, which claims priority to GB Application No. 0424556.9, filed Nov. 8, 2004, granted on Apr. 11, 2006 as GB2415841, the disclosures of which are incorporated by reference herein.

BACKGROUND OF THE INVENTION

The present invention relates to a power conditioning unit, in particular a power conditioning unit for low-power grid-connected applications.

Power converters for photovoltaic modules in the range of 100-300 W have been reported over the past 10 years. For example, "Design optimisation of a single phase inverter for photovoltaic applications" (S.B. Kjaer, F. Blaabj erg, IEEE Power Electronics Specialist Conference, Vol. 3, pp. 1183-1190, Jun. 2003), "A flyback-type single phase utility interactive inverter with low-frequency ripple current reduction on the DC input for an AC photovoltaic module system" (T. Shimizu, K. Wada, N. Nakamura, IEEE Power Electronics Specialist Conference, Vol. 3, pp. 1483-1488, Jun. 2002), "Inverters for single-phase grid connected photovoltaic systems—An overview" (M. Calais, J. Myrzik, T. Spooner, V.G. Agelidis, IEEE Power Electronics Specialist Conference, Vol. 4, pp. 23-27, Jun. 2002) and "A novel ac photovoltaic module system based on the impedance-admittance conversion theory" (S. Yatsuki, K. Wada, T. Shimizu, H. Takagi, M. Ito, IEEE Power Electronics Specialist Conference, Vol. 4, pp. 17-21, Jun. 2001).

A wide range of power electronics topologies are suggested in the literature and some are readily available in the market or patented. EP0780750, JP10174452, U.S. 5898585, DE19732218, EP0947905, JP2000020150, JP2000324852 and JP2003289674 are examples. However, it has been observed that the performance offered by such devices is far from optimal. In some instances the lifetime of the PCU is too short compared to the lifetime of the PV panel, in other cases the cost is excessive, and in others the efficiency is low. It is also reported that there is a compromise among these three factors. The PCU we describe offers a low-cost solution while maintaining a relatively high efficiency and reliability. The system overall cost is reduced by introducing a simple control of the current injection into the grid that uses generic logic gates and operational amplifiers.

BRIEF SUMMARY OF THE INVENTION

According to a first aspect of the present invention there is therefore provided a power conditioning unit for delivering power from a power source to a mains utility supply, the power conditioning unit comprising: a plurality of input terminals for connecting to the power source; a plurality of output terminals for connecting to the mains utility supply; a voltage increasing converter connected to the input terminals; a voltage reducing converter connected to the voltage increasing converter; and a dc-to-ac converter connected to the voltage reducing converter and to the output terminals.

This can provide reduced power losses in the power conditioning unit compared with conventional units utilising PWM control in the inverter transistors. In conventional units, switching losses occur in each inverter transistor, whereas in the examples we will describe, one power control transistor operates in switched mode (e.g. at high frequencies up to 500 kHz), the main inverter transistors being either fully on or fully off and switching only at line rate (e.g. 50 Hz or 60 Hz).

The voltage reducing converter and the dc-to-ac converter may share an inductor, where the inductor is connected at the output of the voltage reducing converter and at the input of the dc-to-ac converter and is configured to function as energy storage device in the voltage reducing converter and as a current smoothing device in the dc-to-ac converter. Preferably the voltage reducing converter comprises a buck converter and the dc-to-ac converter comprises a current mode inverter.

The dc-to-ac converter may incorporate protection diodes connected in series with the transistors in the inverter, so that the protection diodes prevent current flowing in the reverse direction through the body diode of the transistors. This is to prevent current flowing during the switching transitions, when one of the two transistors in a switching pair (e.g. $Q_1$ and $Q_4$ or alternatively $Q_2$ and $Q_3$ in FIG. 1) switches on or turns off faster than the other. Without the protection diodes being present a current may flow from one of the ac power connections through the transistor which is turned on and back through the body diode of the complementary transistor in the other pair. Incorporating the protection diodes may increase the lifetime of the converter by eliminating current spikes in the transistors.

According to a second aspect of the present invention there is provided a method of controlling a power conditioning unit, the power conditioning unit comprising a plurality of input terminals for connecting to a dc power source, a voltage increasing converter connected to the input terminals, a voltage reducing converter connected to the voltage increasing converter, a dc to ac converter connected to the voltage reducing converter and a plurality of output terminals for connecting to a mains utility supply, the output terminals being connected to the dc to ac converter, the method comprising: sensing a voltage on the output terminals; generating a reference current responsive to said sensing, measuring a supply current in the dc to ac converter; and controlling the voltage reducing converter responsive to a difference between the reference current and the supply current; to thereby control the power injected into the mains utility supply.

The reference current generated may be a full wave rectified sinusoid current. This allows the power conditioning unit to supply power to the grid as a sinusoidal current, regardless of any distortion in the grid waveform itself. Alternatively, the reference current may be generated to compensate for distortion in the grid voltage waveform, thereby reducing grid waveform distortion for other devices connected to the grid.

The controlling of the voltage reducing converter may involve turning a power control switch in the voltage reducing converter off if the supply current is greater than the reference current and turning the switch on if the supply current is less than the reference current. The power control switch may be controlled in synchronisation with the generation of the reference current, particularly if the reference current is generated using a digital to analogue converter and a look up table. This has the advantage of reduced component count compared with using separate clock sources for the power control and the reference current generation, and also reduces distortion in the current waveform.

According to a third aspect of the present invention there is provided a power conditioning unit for delivering power from a power source to a mains utility supply the power conditioning unit comprising: input connection means for connecting to the power source; output connection means for connecting to the mains utility supply; voltage increasing means for increasing the voltage supplied to the input connection means; voltage reducing means for reducing the voltage supplied by the voltage increasing means; dc to ac conversion means for converting a direct current supplied by the voltage reducing means to an alternating current suitable for supplying to the mains utility supply; voltage sensing means for sensing a voltage on the output connection means; reference current generation means for generating a reference current responsive to said sensing; current measuring means for measuring a supply current in the dc to ac conversion means; and control means for controlling the voltage reducing means responsive to a difference between the reference current and the supply current.

According to a fourth aspect of the present invention there is provided a power conditioning unit comprising a dc to dc converter and a dc to ac converter, wherein the dc to dc converter and the dc to ac converter share an inductor and wherein the inductor is configured to function as an energy storage inductor in the dc to dc converter and as a current smoothing inductor in the dc to ac converter.

According to a fifth aspect of the present invention there is provided a power conditioning unit incorporating a dc to ac converter, a plurality of transitions connected to the dc connection; a plurality of protection diodes connected in series with the transistors; and a ac connection connected to the diodes, that the protection diodes prevent current flow in the transistors in the reverse direction thereby increasing the device lifetime of said transistors.

According to a sixth aspect of the present invention there is provided a method of increasing device lifetime in a power conditioning unit, the power conditioning unit having a plurality of transistors, the method comprising: providing a plurality of protection diodes in series with the transistors.

The above described features and aspects of the invention may be utilised separately or combined in any permutation. Furthermore, they are not limited to single-phase applications but may be applied to three-phase applications separately or combined in any permutation.

BRIEF DESCRIPTION OF THE DRAWINGS

These and other aspects of the present invention will now be further described, by way of example only, with reference to the accompanying drawings in which.

DETAILED DESCRIPTION OF THE INVENTION

Broadly speaking we will now describe a power conditioning unit (PCU) to inject power from a photovoltaic panel or a fuel cell into the grid in a safe, efficient, and reliable manner. A single-phase low-power converter is presented hereby that features a simple control that can be implemented with inexpensive logic gates and op-amps. A basic microcontroller is used to measure environment variables such as voltages, currents, and temperature in order to comply with standards, and to coordinate the connection with the grid. The PCU topology includes a generic dc-ac-dc that provides voltage amplification and isolation, as it is required in some regulations and a current source inverter (CSI) connected to the mains. The current injection is regulated using current-mode-control in the inductor of the CSI via an intermediate buck-type stage.

Three conversion stages are utilized in the system. First, the dc-link voltage is maintained above the grid voltage magnitude via a dc-ac-dc converter with isolation transformer. This stage is controlled in open loop and hence the voltage appearing at the dc-link is that of the source amplified by the turns ratio of the transformer. Various generic topologies can be used for this purpose and therefore this block is considered here only as a voltage amplifier.

Two additional conversion stages control the current injection into the grid: a buck circuit featuring current-mode-control (CMC) in conjunction with a current source inverter (CSI) switching at 50 Hz in synchronism with the grid as will be explained.

Figure 1:
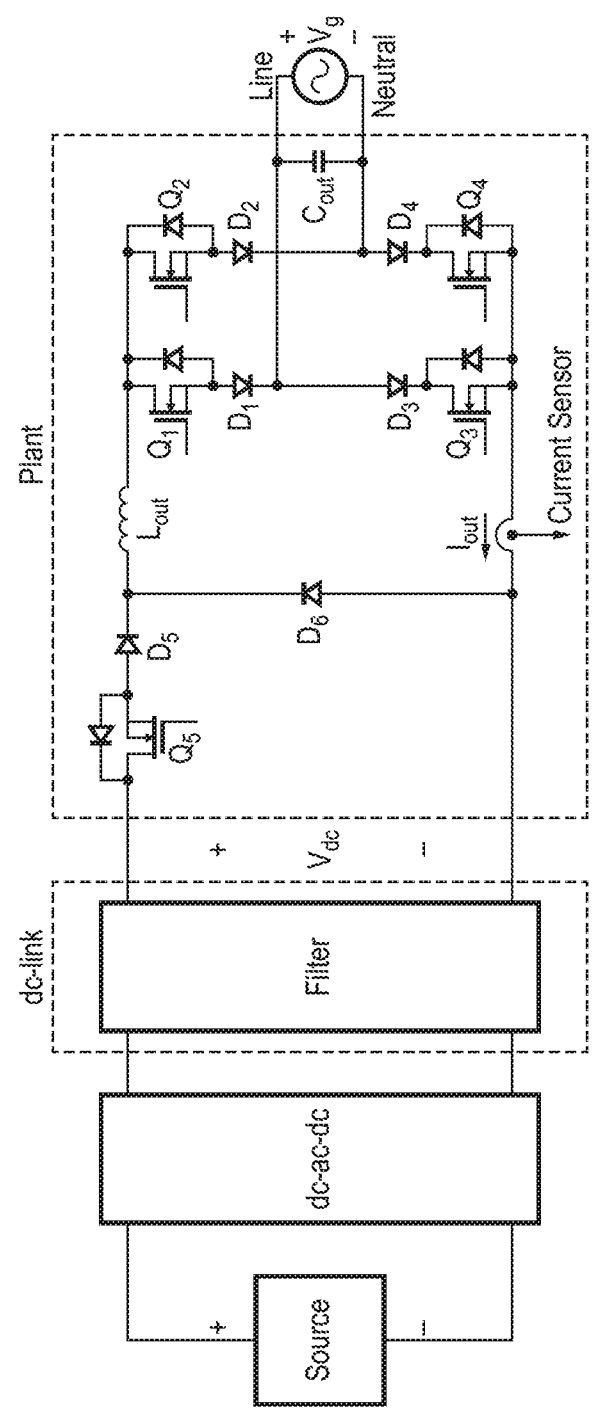
FIG. 1 shows a power conditioning unit for single-phase grid-connected distributed resources.

A power conditioning unit for single-phase grid-connected distributed resources is shown in FIG. 1. It comprises a generic dc-ac-dc converter that steps up or amplifies the voltage of the source to a voltage level above the grid voltage magnitude. Among the many possibilities of such a converter are: Full-bridge inverter and full-bridge rectifier, push-pull converter, flyback converter, feed-forward converter, resonant converter with transformer. The output of this converter is connected to a filter that prevents the flow of high frequency components in current and voltage. The input and output of this filter form what is called dc-link as depicted in FIG. 1.

We will describe the operation of transistors $Q_1$ to $Q_5$, diodes $D_1$ to $D_6$, inductor $L_{out}$, capacitor $C_{out}$, and the current sensor. The grid voltage terminals from the residential outlet, line and neutral, are connected in parallel with capacitor $C_{out}$. The line terminal is connected at the node between diodes $D_1$ and $D_3$, and the neutral terminal is connected at the node between diodes $D_2$ and $D_4$.

Transistors $Q_1$ and $Q_4$ are switched on during the positive half cycle of the grid voltage waveform and $Q_2$ and $Q_3$ during the negative half cycle. Diodes $D_1$ —$D_4$ prevent a short circuit in the grid due to glitches in the transistor drivers that might result in destruction of the converter. During the transition between one half cycle and the other, it is impossible for the transistors in each pair ($Q_1$ and $Q_4$, $Q_2$ and $Q_3$) to change state at exactly the same time. If, for example, $Q_1$ and $Q_4$ are switched off and $Q_3$ is switched on but $Q_2$ has not yet been switched on, a current may flow from the line grid terminal through $Q_3$ and back through the body diode of $Q_4$ to the neutral grid terminal. More generally, if at any time one of the transistors in a pair is on and the other off, such a current may flow. Adding diodes $D_1$—$D_4$ prevents grid currents flowing through the body diodes, hence prolonging the lifespan of the converter. Although these diodes reduce the overall efficiency of the converter they improve the reliability since they protect the transistors.

$D_6$ acts as a free-wheeling diode and $D_5$ prevents current form flowing back into the dc-link. When transistor $Q_5$ is switched on, a current builds up through $L_{out}$. When $Q_5$ is switched off, this current cannot return to zero immediately so $D_6$ provides an alternative path for current to flow from the negative supply rail. Because of the body diode in $Q_5$, it might be possible for a current to flow back into the dc-link when $Q_5$ is switched off; $D_5$ prevents this happening.

Finally, the current injection into the grid is controlled using transistor $Q_5$. When $Q_5$ is turned on the current flowing through $L_{out}$ increases and decreases when it is turned off thus achieving current-mode-control. This is always true as long as the dc-link voltage is maintained higher than the grid voltage magnitude. Hence the current is forced to follow a rectified sinusoid which is in turn unfolded by the full-bridge output (transistors $Q_1$ to $Q_4$).

The information from the current sensor is used to feed-back the instantaneous current value to the control circuits. As mentioned previously the current injection is controlled using CMC. The inductor current, $i_{out}$, is compared to a reference current, $i_{ref}$, to decide whether or not to switch on transistor $Q_5$. If the reference current is higher than $i_{out}$ then the transistor is turned on. It is switched off otherwise. The decision is buffered and stored using a D flip-flop with a clock signal (CLK) in the range of 100 kHz to 500 kHz. The control block diagram is shown in FIG. 2.

Figure 2:
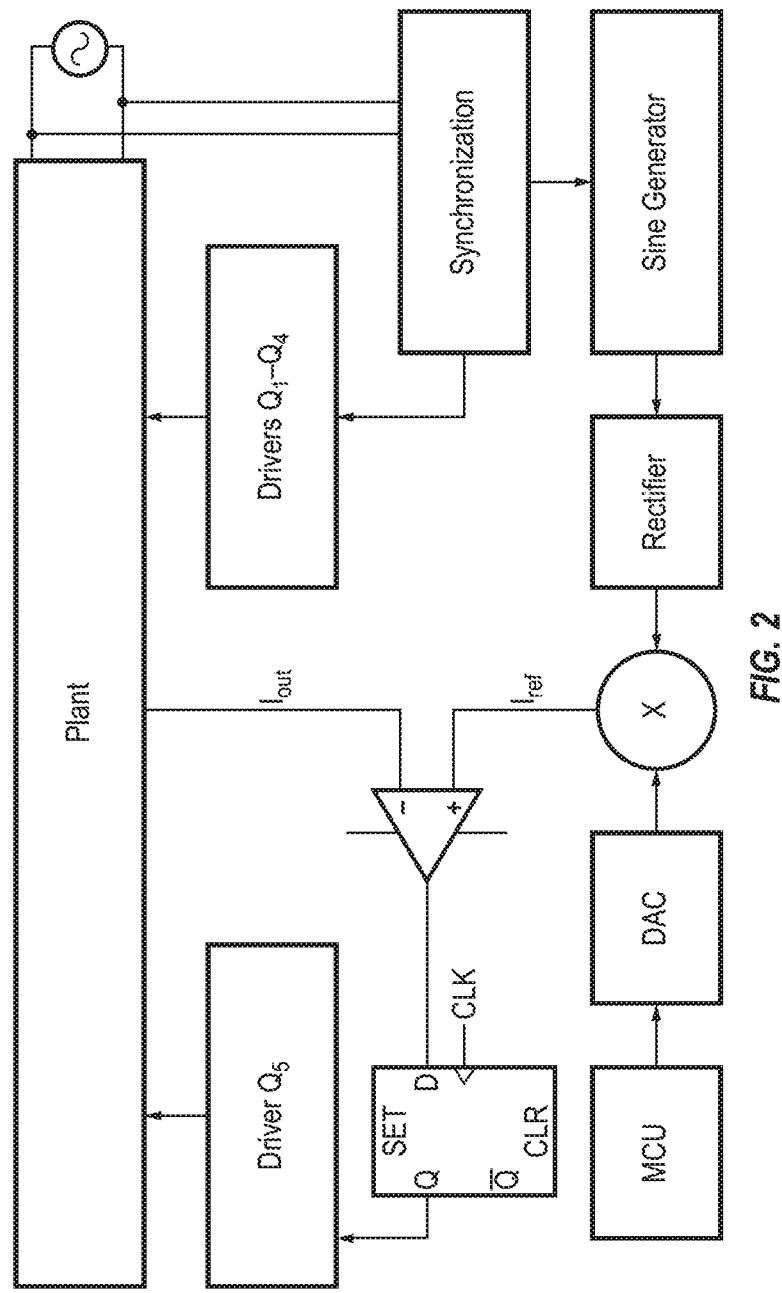
FIG. 2 shows a control block diagram suitable for use with the power conditioning unit of FIG. 1.

The Plant block in FIG. 2. is formed by transistors $Q_1$ to $Q_5$, diodes $D_1$ to $D_6$, inductor $L_{out}$, capacitor $C_{out}$, and the current sensor. A driver is a circuit that provides the right voltage and current levels necessary to turn on or off a specific transistor. The Synchronisation block provides digital signals in synchronism with the grid voltage, i.e. a high level when the grid voltage is positive and a low level otherwise. The Sine generator provides an almost pure sinusoid voltage in synchronism with a signal coming from the Synchronisation block. This can be achieved in various ways. The simplest approach is to sense the voltage from the grid terminals using a high-common mode differential operational amplifier. In this case any distortion in the mains is carried on as distortion in the current waveform. Another way is to use a waveform generator and a phase-lock-loop so that both waveforms are in synchronism. Integrated circuits that accomplish this task normally provide waveforms with a THD between 3 and 5%. A third way is to generate it digitally using a look-up table and a digital to analogue converter. Minimum distortion can be achieved by having a large resolution, e.g. 12 bits, and a fast sampling rate, e.g. 500 KHz.

This sinusoidal voltage is rectified by an additional circuit. Furthermore, the blocks Rectifier and Sine generator can be combined into a single block that performs both actions simultaneously. For example, a look-up table may be used comprising a rectified sinusoid waveform, or the first half of a sinusoid output at twice the frequency of the grid voltage. One additional possibility is to clock the D flip-flop used to buffer the output of the comparator at the same high frequency used to step through the look-up table. This is possible since the output of the comparator is read into the flip-flop at discrete intervals, so the reference current input to the comparator may be updated at the same frequency.

The MCU block contains a microcontroller unit and the DAC block contains a digital to analogue converter circuit. The reference current, $i_{ref}$, is generated by multiplying a constant voltage, from the DAC, by a rectified sinusoidal template, from the Rectifier (or equivalent circuit as described above), in synchronism with the electric grid voltage. The constant voltage coming from the digital to analogue converter (DAC) provides the amplitude of the reference current and therefore the power injection level. This is controlled from the microcontroller unit (MCU). The comparison between the reference current and the sensed current is done through a high speed comparator integrated circuit or operational amplifier.

Figure 3:
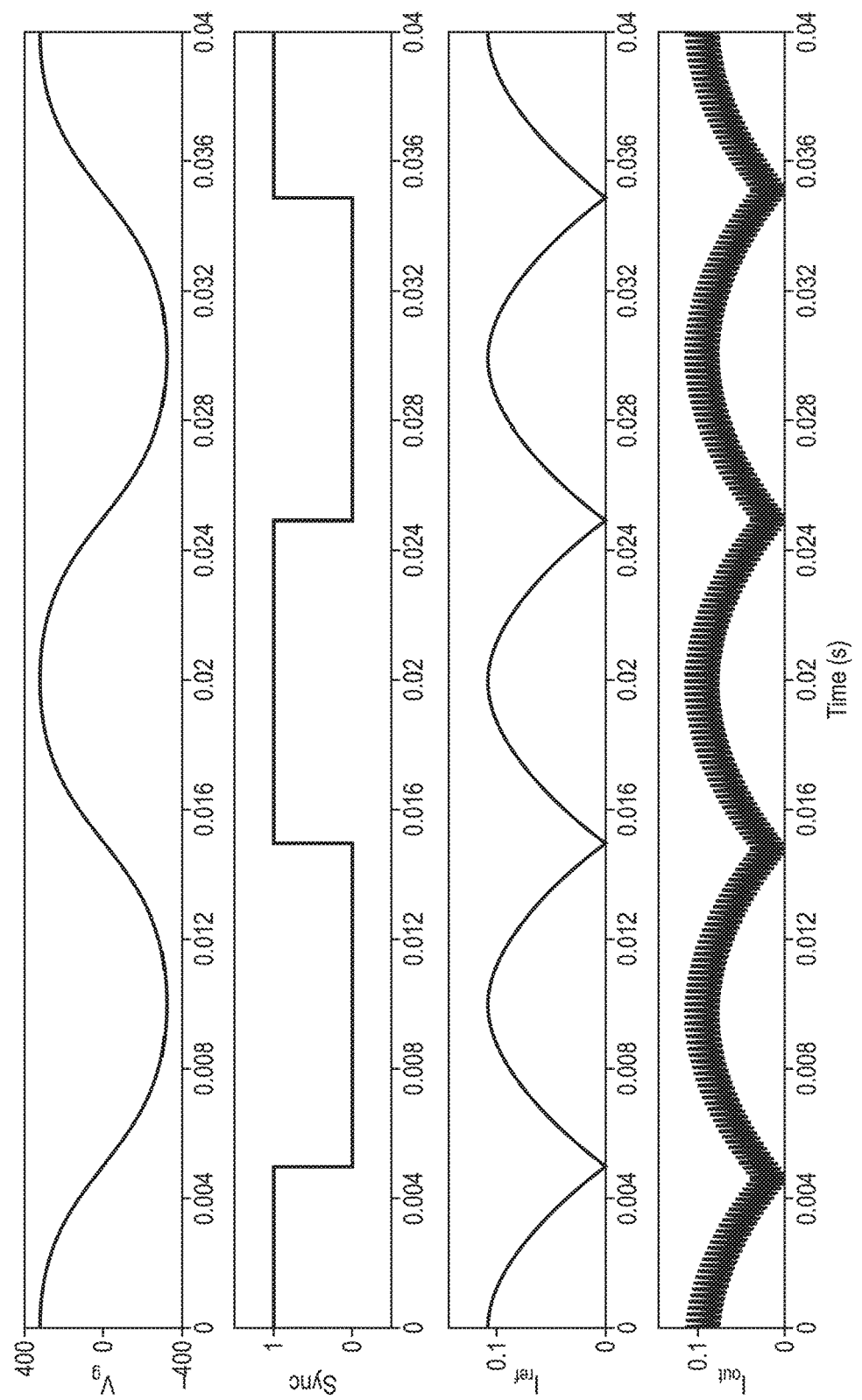
FIG. 3 shows waveforms of the synchronisation block, the reference current, the output current and the grid voltage of FIG. 2.

Waveforms of the synchronisation block, the reference current, the output current and the grid voltage are shown in FIG. 3.

Figure 4:
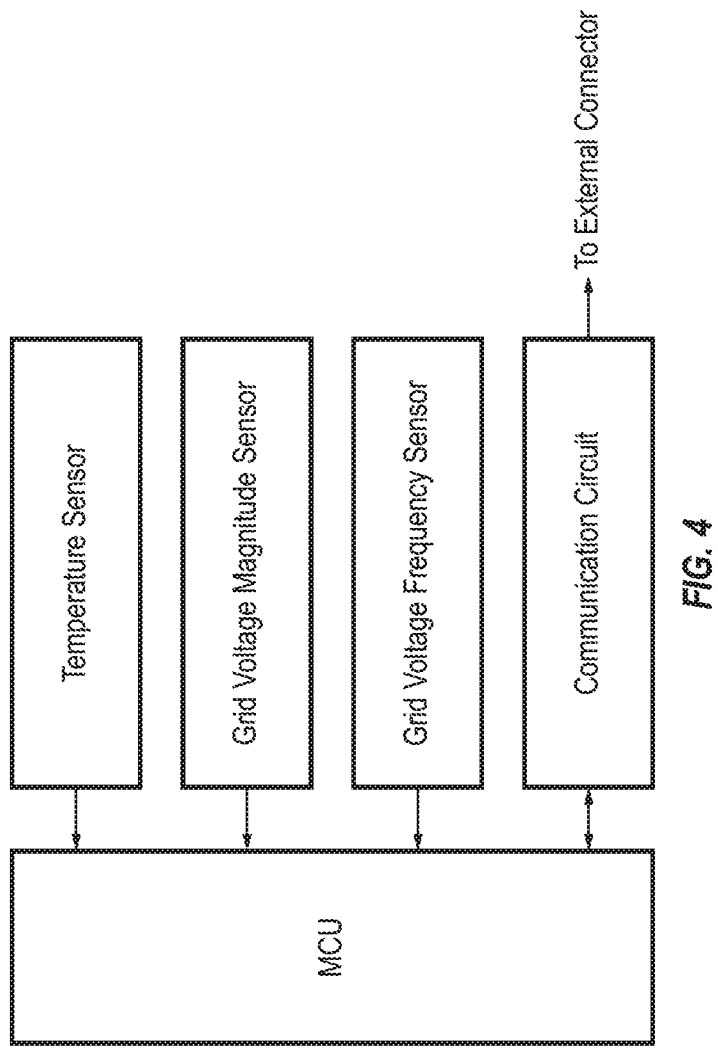
FIG. 4 shows functions of the microcontroller unit of FIG. 2.

In addition, the MCU monitors the temperature of the system, the grid voltage magnitude, the grid voltage frequency, and incorporates communication protocols for external monitoring through a computer. These tasks are depicted in FIG. 4.

The complete system has been tested at 50 watts in the laboratory achieving 87% efficiency and 4.7% total harmonic distortion (THD) in the current.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:
1. A power conditioning unit for delivering power received from a DC power source to an AC grid, the power conditioning unit comprising:
   a DC-DC converter including an input connected to the DC power source;
   a current injection circuit coupled to an output of the DC-DC converter and including a switch coupled in series with an inductor;
   a DC-AC converter including an input coupled to the current injection circuit and an output coupled to the AC grid;
   a control circuit coupled to the current injection circuit and comprising:
      a synchronization circuit that receives input from the AC grid and (1) synchronizes the DC-AC converter to the AC grid and (2) generates rectified sinusoidal voltage synchronized to the AC grid;
      a microcontroller that generates a constant voltage that is multiplied with the rectified sinusoidal voltage to generate a sinusoidal reference current; and
      a comparator that compares the sinusoidal reference current to a current flowing through the inductor and turns on and off the switch in response to a difference between the sinusoidal reference current and the current flowing through the inductor.

2. The power conditioning unit of claim 1 wherein the comparator turns the switch on when the current flowing through the inductor is lower than the sinusoidal reference current.

3. The power conditioning unit of claim 1 further comprising a DC link coupled to an output of the DC-DC converter.

4. The power conditioning unit of claim 3, wherein the DC link includes a filter that prevents a flow of high frequency components in current and voltage.

5. The power conditioning unit of claim 3 wherein the DC link functions as an energy storage component in the DC-DC converter and as a current smoothing inductor in the DC-AC converter.

6. The power conditioning unit of claim 1 wherein the switch is controlled in synchronization with the sinusoidal reference current.

7. The power conditioning unit of claim 1 further comprising a reference current generating circuit uses a digital to analog converter and a look up table that comprises a rectified sinusoid waveform.

8. The power conditioning unit of claim 1, wherein the DC-AC converter comprises a plurality of transistors and a plurality of protection diodes so that the protection diodes prevent current flow in a reverse direction in the plurality of transistors.

9. The power conditioning unit of claim 1, wherein the DC-DC converter uses an open loop control algorithm.

10. The power conditioning unit of claim 1, wherein the current injection circuit controls power transferred to the AC grid using current mode control.

11. The power conditioning unit of claim 1, wherein the switch is a transistor.

12. The power conditioning unit of claim 1, wherein the comparator compares an instantaneous value of the sinusoidal reference current with an instantaneous value of the current flowing through the inductor and controls the switch to regulate sinusoidal current injection by a current source inverter into the AC grid.

13. The power conditioning unit of claim 1 further comprising a buffer coupled to an output of the comparator.

14. The power conditioning unit of claim 13 wherein the buffer operates a greater frequency than a frequency of the AC grid.

15. The power conditioning unit of claim 1 wherein the synchronization circuit includes a phase-lock-loop to synchronize waveforms.

* * * * *